(12) United States Patent
Ide et al.

(10) Patent No.: US 11,590,967 B2
(45) Date of Patent: Feb. 28, 2023

(54) CONTROL DEVICE FOR AUTOMATED DRIVING VEHICLE

(71) Applicant: TOYOTA JIDOSHA KABUSHIKI KAISHA, Toyota (JP)

(72) Inventors: Hirohito Ide, Nagoya (JP); Yuchi Yamanouchi, Toyota (JP); Keiji Yamashita, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 17/101,459

(22) Filed: Nov. 23, 2020

(65) Prior Publication Data

US 2021/0162990 A1 Jun. 3, 2021

(30) Foreign Application Priority Data

Dec. 3, 2019 (JP) .............................. JP2019-218845

(51) Int. Cl.
*B60W 30/08* (2012.01)
*B60W 50/08* (2020.01)
*B60W 50/14* (2020.01)

(52) U.S. Cl.
CPC .......... *B60W 30/08* (2013.01); *B60W 50/085* (2013.01); *B60W 50/14* (2013.01); *B60W 2554/4029* (2020.02); *B60W 2554/4041* (2020.02)

(58) Field of Classification Search
CPC .... B60W 30/08; B60W 30/09; B60W 30/095; B60W 30/0956; B60W 30/18145; B60W 30/18154; B60W 30/18159; B60W 50/085; B60W 50/10; B60W 50/14; B60W 60/00276; B60W 2050/146; B60W 2540/00; B60W 2540/215; B60W 2554/4029; B60W 2554/4041; B60W 2554/4042; B60W 2554/801
See application file for complete search history.

(56) References Cited

U.S. PATENT DOCUMENTS

2019/0375430 A1* 12/2019 Emura ............ B60W 30/18159

FOREIGN PATENT DOCUMENTS

| JP | 2018-144570 A | 9/2018 |
| JP | 2019-077427 A | 5/2019 |
| JP | 2019077427 A * | 5/2019 |

* cited by examiner

*Primary Examiner* — Peter D Nolan
*Assistant Examiner* — Ce Li Li
(74) *Attorney, Agent, or Firm* — Oliff PLC

(57) ABSTRACT

The present disclosure relates to control performed in a case where a vehicle is to turn right or left at an intersection. A control device causes the vehicle to carry out a right turn or left turn when a travel start button for starting travel from a stopped state is manipulated while the vehicle is in a stopped state due to presence of a target to be paid attention to during travel, such as a vehicle in an opposite lane or a pedestrian.

2 Claims, 4 Drawing Sheets

CONTROL DEVICE FOR AUTOMATED DRIVING VEHICLE

CROSS REFERENCE TO RELATED APPLICATION

This application claims priority to Japanese Patent Application No. 2019-218845 filed on Dec. 3, 2019, which is incorporated herein by reference in its entirety including the specification, claims, drawings, and abstract.

TECHNICAL FIELD

The present disclosure relates to a control device for an automated driving vehicle, and more particularly to control for turning right or left at an intersection (i.e., passing an intersection across the opposite lane).

BACKGROUND

Conventionally, various suggestions have been made concerning automated driving vehicles. For example, JP 2018-144570 A discloses a technology of performing automated driving in accordance with circumstances even when obstacles are present, and describes a technique in which, when there is a vehicle in the opposite lane at an instance of turning right (i.e., passing an intersection across the opposite lane), a notification in that regard is provided to an onboard person. JP 2018-144570 A further describes ruling out the possibility of collision and making the right turn upon detecting, for example, that the onboard person has executed a sweeping hand gesture.

However, according to JP 2018-144570 A, since it is necessary to detect the onboard person's gesture indicating permission for a right turn (i.e., passage of an intersection across the opposite lane) and determine the meaning of the gesture, the required processing is complicated. For this reason, there may be cases in which proper detection cannot be realized. Furthermore, a device for performing special detection concerning permission for a right turn (i.e., passage of an intersection across the opposite lane) becomes necessary.

SUMMARY

According to the present disclosure, there is provided a control device for an automated driving vehicle, wherein, in a case where an intersection is to be passed by making a right turn or left turn, the control device causes the vehicle to carry out the right turn or left turn when a travel start button for starting travel from a stopped state is manipulated while the vehicle is in a stopped state due to presence of a target to be paid attention to during travel, such as a vehicle in an opposite lane or a pedestrian.

While the vehicle is in the stopped state due to presence of a vehicle in an opposite lane, the control device may activate and thereby place the travel start button in a manipulation standby state, and may further provide, to an onboard person, a notification informing that the travel start button has become active.

The control device may have a collision damage reduction function to carry out, when there is a high risk of collision, a measure for reducing collision damages to an onboard person. In response to manipulation of the travel start button, the control device may disable or restrict the collision damage reduction function as compared to a case in which the travel start button is not manipulated, and subsequent to starting travel, after the vehicle has traveled for a predetermined period of time or over a predetermined distance, the control device causes the collision damage reduction function to recover its normal state.

According to the present disclosure, in an automated driving vehicle, right and left turns at intersections can be carried out appropriately.

BRIEF DESCRIPTION OF DRAWINGS

Embodiment(s) of the present disclosure will be described based on the following figures, wherein.

DESCRIPTION OF EMBODIMENTS

An embodiment according to the present disclosure will be described below by reference to the drawings.
[Vehicle Configuration]

Figure 1:
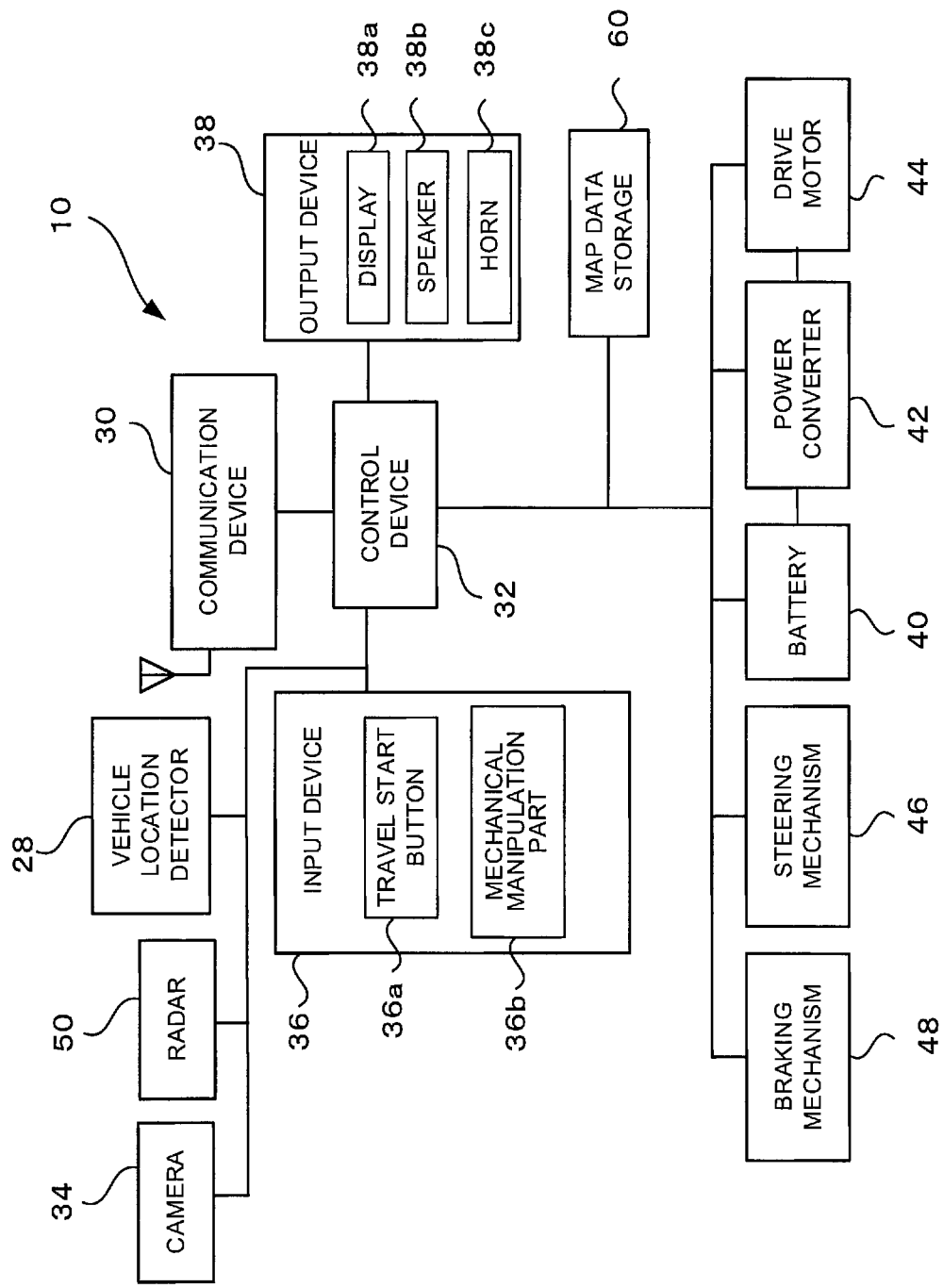
FIG. 1 is a block diagram showing a configuration of an automated driving vehicle (hereinafter simply referred to as a ⬚vehicle⬚) 10.

FIG. 1 is a block diagram showing a configuration of an automated driving vehicle (hereinafter simply referred to as a ⬚vehicle⬚) 10. Here, the term ⬚automated driving⬚ widely signifies causing a vehicle to travel automatically, including performing steering and acceleration/deceleration without manipulation by a driver or the like.

In the present embodiment, the vehicle 10 in an automatic driving mode travels along a pre-specified route by performing automatic steering and automatic acceleration/deceleration while monitoring areas around the vehicle.

A communication device 30 performs wireless communication with external facilities. For example, the communication device 30 performs: communication with a travel operation management center that manages travel operation of automatic driving vehicles in a local area; vehicle-to-vehicle communication with other vehicles traveling nearby; and communication with various beacons and the like installed along roads.

For example, in a case where the vehicle 10 is one that travels along a pre-specified managed route upon receiving permission from the travel operation management center, the vehicle 10 may receive the permission at the time of starting travel, and during travel, may receive as necessary from the travel operation management center a transmission of a travel operation schedule including a target time of arrival to a predetermined site.

A control device 32 is connected to the communication device 30, and information transmitted or received by the communication device 30 is processed by the control device 32. The control device 32 controls overall operation of the vehicle 10, including its travel.

To the control device 32, there are connected a vehicle location detector 28, a camera 34, a radar 50, and an input device 36 for inputting data. Data such as a location of the vehicle detected by the vehicle location detector 28, images of areas around the vehicle 10 captured by the camera 34, information on locations of other vehicles obtained by the radar, and travel-related commands inputted via the input device 36 are supplied to the control device 32. The vehicle location detector 28 includes a GNSS device, such as a GPS device, and a gyroscope, and detects as necessary the location of the vehicle using these devices and also using location information obtained from beacons, transmitters at bus stops, and the like located along the travel route. Here, the camera 34 may capture images of areas in the rear and lateral directions, in addition to the front direction. Further, the radar 50 is, for example, a millimeter-wave radar, and detects objects located in areas toward the front, rear, diagonal front, and so on, as well as moving objects. Accordingly, using the radar 50, it is possible to acquire information regarding locations and states of travel of other vehicles such as vehicles in the opposite lane and vehicles traveling in a road intersection.

Using the input device 36, various operational instructions are input, and information regarding destinations and travel routes is also input. The input device 36 includes a travel start button 36a for instructing start of travel from a stopped state, and a mechanical manipulation part 36b which is mainly used in the manual driving mode for performing manipulations for steering, acceleration/deceleration, and the like. Further, an output device 38 including a display 38a, a speaker 38b, and a traffic horn 38c is connected to the control device 32, and necessary information is output from this output device 38 to an onboard person.

Here, although the input device 36, the output device 38, and the manipulation parts included therein are described above as separate elements, an input/output device such as a touch screen can alternatively be used. Further, a single manipulation part may be used for two separate functions, such as by allocating a long press of the manipulation part for another switching manipulation function.

A map data storage 60 is also connected to the control device 32. Map data such as three-dimensional map data are stored in the map data storage 60, and using the map data, the control device 32 performs operations such as a route search conducted upon setting a destination, obstacle detection, and the like. The map data may be supplied from outside via communication.

The vehicle 10 has installed therein a battery 40, a power converter 42, and a drive motor 44. DC power from the battery 40 is converted into desired AC power at the power converter 42 and supplied to the drive motor 44. The drive motor 44 is driven thereby, and the output from the drive motor 44 rotates the wheels and causes the vehicle 10 to travel. Steering of the vehicle 10 is controlled by a steering mechanism 46. Further, deceleration and stopping of the vehicle are controlled by a braking mechanism 48. The power converter 42, the steering mechanism 46, and the braking mechanism 48 are connected to the control device 32, and the control device 32 controls travel (i.e., steering and acceleration/deceleration) of the vehicle 10. Regenerative braking of the drive motor 44 is also performed by controlling the power converter 42.

In the vehicle 10 as described above, travel control can be performed so as to cause the location detected by the vehicle location detector 28 to match a predetermined location. Accordingly, when a travel route is designated, automatic travel along the designated route is possible.

The map data storage 60 has stored therein three-dimensional map data, as noted above. Using this data and other information such as images from the camera 34, obstacles can be detected, and collisions therewith can be avoided by steering and braking. It is also possible to provide an acceleration sensor for detecting acceleration in the travel direction and the rotational (yaw) direction, and perform feedback control on travel velocity and steering.

[Operation Upon Turning Right (i.e., Passing an Intersection Across the Opposite Lane)]

Figure 2:
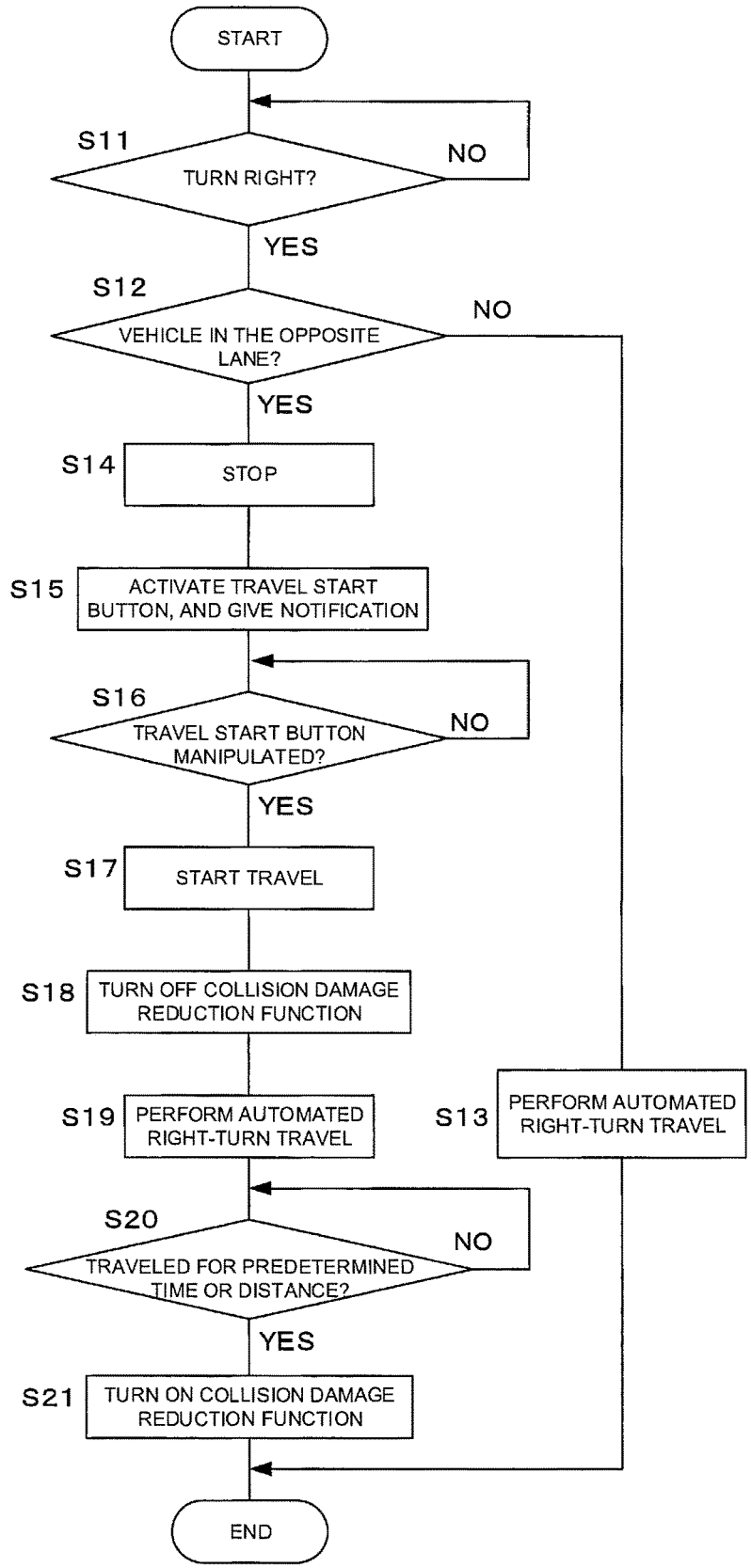
FIG. 2. is a flowchart illustrating an operation performed when turning right (i.e., passing an intersection across the opposite lane)

FIG. 2 is a flowchart illustrating an operation performed when turning right. Here, in the present embodiment, a ┘right turn□ is referred to by assuming left-hand traffic, in which vehicles travel on the left side of the road. In the case of right-hand traffic, a ⌐left turn□ applies. In other words, the present control is basically directed to passage of an intersection across the opposite lane. However, the present control may also cover right and left turns made without crossing the opposite lane.

Automated driving of the vehicle 10 is started when an onboard person manipulates the travel start button 36a and the vehicle starts traveling from a stopped state. During normal travel, the travel start button 36a remains inactive (i.e., inoperable). During travel, a determination is made regarding whether the vehicle has arrived at an intersection for making a right turn (S11). Here, at the point when the vehicle 10 has approached the intersection for making a right turn, as a part of normal operation to be performed in advance, the vehicle 10 enters the right-turn lane and decelerates to a predetermined velocity in preparation for turning right. When the vehicle has entered the intersection for making a right turn, a determination is made regarding whether a vehicle is in the opposite lane (S12). This determination corresponds to a determination regarding whether or not a right turn can be made, and therefore includes determining whether there are any targets to be paid attention to when traveling to turn right, such as whether there are any pedestrians. The targets to be paid attention to when traveling to turn right include, for example, a pedestrian walking on a crosswalk in the intersection, and a person or a bicycle on a sidewalk by the intersection and about to start crossing the intersection. The determination may be made comprehensively based on images from the camera 34, results detected by the radar 50, and the like. When the determination in S12 is NO, a right turn can be made, and the vehicle turns right by automated driving (S13).

When it is determined in S12 that there is a vehicle in the opposite lane; that is, when a hindrance to turning right is present, the vehicle stops in a right-turn standby state (S14). Subsequently, the travel start button 36a is activated (S15) and thereby placed in a manipulation standby state.

At this point, a notification informing that the travel start button 36a has become active is provided to an onboard person. The notification can be provided by, for example, changing the color of the travel start button 36a shown on a screen, or lighting up or blinking the travel start button 36a. Further, a sound or vibration may be output. By lighting up or otherwise highlighting the travel start button 36a after causing the vehicle 10 to stop, it becomes clear as to when the travel start button 36a should be pressed by the onboard person, and as such, manipulation by the onboard person can be guided.

Subsequently, a determination is made regarding whether or not the travel start button 36a has been manipulated (S16). More specifically, the onboard person judges whether a right turn can be made, and permission to turn right is given by the onboard person via manipulation of the travel start button 36a. In response to the manipulation of the travel start button 36a, the vehicle 10 starts traveling (S17), and at the same time, a collision damage reduction function is turned off (i.e., disabled) (S18). Instead of turning off, it is alternatively possible to restrict the collision damage reduction function by, for example, limiting application of the function to an area within the intended travel path. When it is determined based on information such as images from the camera 34 and results detected by the radar 50 that there is a danger, the start of travel may be cancelled.

Subsequently, the vehicle turns right at the intersection by automated driving (S19). Further, when travel has been carried out for a predetermined period of time or over a predetermined distance (i.e., YES in S20), the collision damage reduction function is recovered to the normal state (i.e., turned on (enabled), or the restriction is released) (S21).

Here, the collision damage reduction function is a function to effect damage reducing measures when collision risk is determined to be high based on results detected by the radar 50 and the like. The damage reducing measures include issuance of a collision alarm, brake assist control for assisting braking power, seat belt control for winding up a seat belt using a motor so as to restrain an onboard person, airbag control for starting preparation for operating an airbag, and so on. By having the collision damage reduction function turned off at the time of making a right turn, the right turn can be completed smoothly, and the collision damage reduction function can be effectively employed during subsequent normal travel. The collision damage reduction function may remain turned off until completion of the right turn operation.

As such, according to the present embodiment, after the vehicle is stopped once at the time of turning right at an intersection, a right turn can be carried out via manipulation of the travel start button 36a by an onboard person. Accordingly, in cases such as when the vehicle 10 and another vehicle in the opposite lane both come to a standstill due to giving way to each other, a right turn can be completed appropriately.

While a travel start command is given using the travel start button 36a, this travel start button 36a is also used at times other than when turning right. For example, the travel start button 36a is used for causing the vehicle 10 to start traveling from a stopped state in the following situations:

At the time of initiating automatic driving, by having the travel start button 36a manipulated, travel of the vehicle 10 is started so as to initiate automatic driving; and When the vehicle has been stopped by a collision avoidance function upon detecting an obstacle during travel, travel is started by having the travel start button 36a manipulated.

By allowing the travel start button 36a used for a number of functions of automatic driving to also serve as the travel start button for making a right turn, there is no necessity to newly provide a separate button. Further, since manipulation of the travel start button 36a is an explicit manipulation, a right turn can be made without detecting any special right-turn permitting movement shown by an onboard person. Furthermore, when the travel start button 36a should be manipulated, a notification in that regard is given, so that the onboard person can easily manipulate the travel start button 36a.

[Operation Panel]

In FIG. 1, the input device 36 and the display 38a serving as the output device 38 are shown separately. However, a touch screen or the like is often used as the input device 36, and in such cases, a contact or an approach made with an operator's finger or the like with respect to a front surface of the display 38a serving as the output device 38 is detected as an input.

Figure 3:
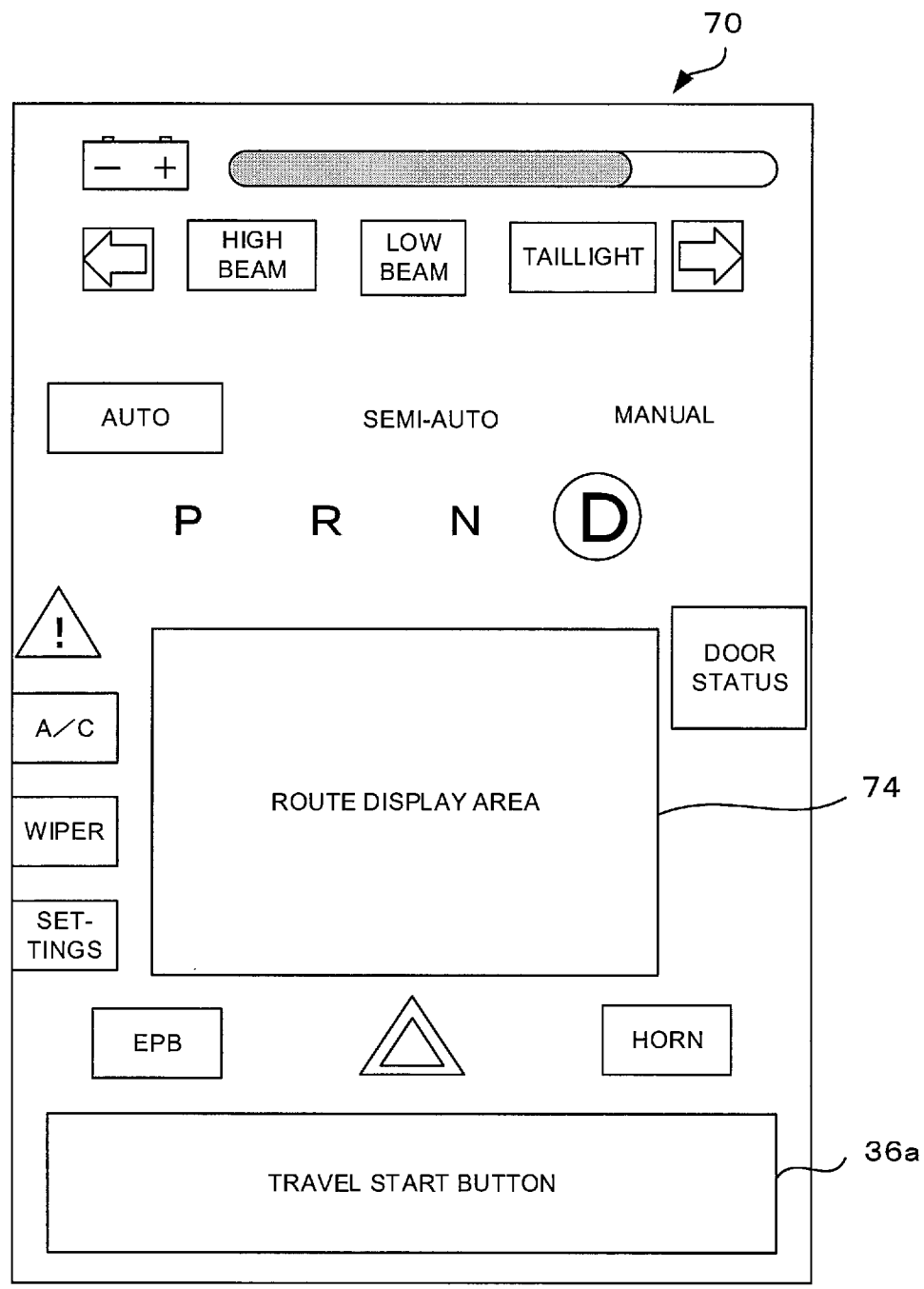
FIG. 3 is a diagram showing an example configuration of a touch screen serving as an input/output device.

FIG. 3 is a diagram showing an example configuration of a touch screen 70 serving as an input/output device. At the uppermost left part of the screen, a battery mark is shown, and on its right, the remaining battery charge is indicated with a bar. In the next lower row, blinkers are displayed on the left and right sides, and in the center, there are arranged displayed operation buttons for headlamp high beam and low beam, and a displayed operation button for taillight.

In the next lower row, three mode selection buttons for respectively selecting automated (AUTO) mode, semi-automated (SEMI-AUTO) mode, and manual (MANUAL) mode are provided. By operating any one of these mode selection buttons, the corresponding mode is set. The semi-automated mode is an automated driving mode to be set under, for example, a condition in which communication with the outside is restricted. The manual mode is a mode in which the vehicle is caused to travel according to manipulation by a driver.

In the next lower row, displayed operation buttons for gear shifting are provided, which are lighted up while display of the current shift range is enlarged.

In the next lower row, a route display area 74 is provided, which enables display of routes, destination options, and various displayed operation buttons. On the left of and underneath this route display area 74, displayed operation buttons for various devices are arranged.

In the lowermost row, the travel start button 36a is arranged. As noted above, this travel start button 36a is provided for confirming, via its manipulation by an onboard person, an intention to start traveling, and is used commonly for a plurality of travel start operations.

When the travel start button 36a is activated, its displayed state is changed as described above, and an onboard person can thereby be aware that this instance is the time for manipulating the travel start button 36a.

[Avoiding Collisions with Obstacles]

Figure 4:
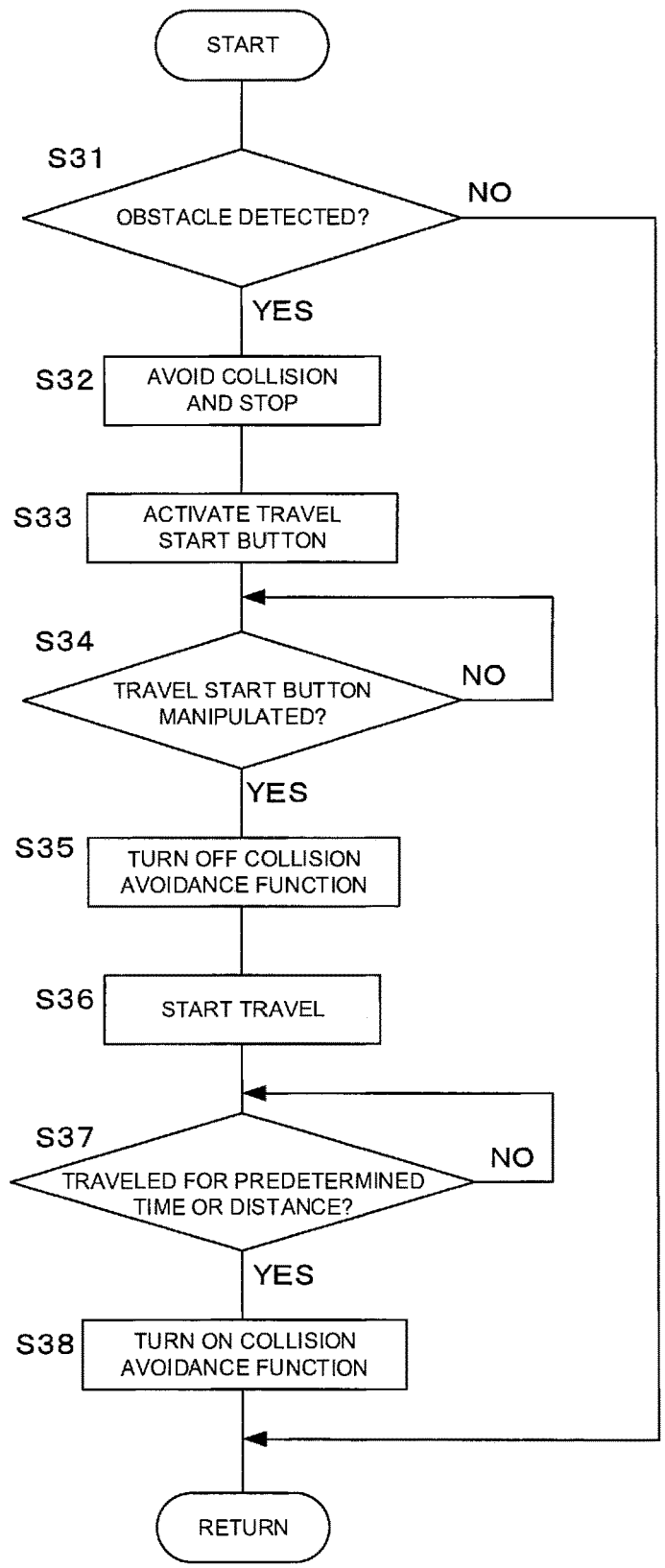
FIG. 4 is a flowchart illustrating a collision avoidance operation.

FIG. 4 is a flowchart illustrating a collision avoidance operation. Initially, settings for collision avoidance during normal travel are such that the collision avoidance function is turned on and the travel start button is inactive (i.e., inoperable). During travel, a determination is made regarding whether an obstacle is detected (S31). When an obstacle is detected, a collision avoidance operation is executed, and the vehicle is stopped (S32). While the collision avoidance operation may include steering to avoid collision with the obstacle and stopping the vehicle at a roadside, in a case where collision can be avoided by simply stopping the vehicle, the collision avoidance operation may alternatively only include stopping the vehicle.

When the vehicle is stopped as described above, the travel start button 36a is activated (i.e., made operable) (S33). The travel start button 36a may be activated after the control device 32 confirms safety based on images from the camera 34 and the like.

Subsequently, a determination is made as to whether the travel start button 36a has been manipulated (S34). More specifically, the vehicle 10 that has been stopping for collision avoidance starts traveling again when safety is confirmed. Although safety confirmation can also be based on images from the camera 34 and the like, final confirmation is to be based on human judgment. In this arrangement, it is understood that manipulation of the travel start button 36a by a person aboard the vehicle 10 indicates that safety confirmation was successful.

When it is determined in S34 that the travel start button 36a has been pressed, firstly, the collision avoidance function is turned off (S35) to cancel the state of being stopped by the collision avoidance function. Then, the vehicle 10 starts traveling (S36). In this example, travel is carried out by executing acceleration/deceleration and steering by automated driving.

Subsequently, a determination is made as to whether the vehicle has traveled for a predetermined period of time or over a predetermined distance (S37). When the result of this determination is YES, the collision avoidance function is turned on (S38). As a result, the vehicle resumes normal automated travel.

As such, according to the present embodiment, while in a state of being stopped by the collision avoidance function, the vehicle 10 starts traveling under the condition that the travel start button 36a has been manipulated by an onboard person. Accordingly, inadvertent starting of travel can be reliably prevented.

REFERENCE SIGNS LIST

10 vehicle; 28 vehicle location detector; 30 communication device; 32 control device; 34 camera; 36 input device; 36a travel start button; 38 output device; 38a display; 38b speaker; 38c horn; 40 battery; 42 power converter; 44 drive motor; 46 steering mechanism; 48 braking mechanism; 50 radar; 60 map data storage; 70 touch screen; 74 route display area.

The invention claimed is:

1. A control device for an automated driving vehicle, the control device containing memory and a processor programmed to perform the following:

in a case where an intersection is to be passed by making a right turn or left turn, the control device is programmed to cause the vehicle to carry out the right turn or left turn when a travel start button for starting travel from a stopped state is manipulated while the vehicle is in a stopped state due to presence of a target to be paid attention to during travel, such as a vehicle in an opposite lane or a pedestrian, the control device is programmed with a collision damage reduction function to carry out, when there is a high risk of collision, a measure for reducing collision damages to an onboard person, and in response to manipulation of the travel start button, the control device is programmed to disable or restrict the collision damage reduction function as compared to a case in which the travel start button is not manipulated, and, subsequent to starting travel, after the vehicle has traveled for a predetermined period of time or over a predetermined distance, the control device is programmed to cause the collision damage reduction function to recover its normal state.

2. A control device for an automated driving vehicle, the control device containing memory and a processor programmed to perform the following:

in a case where an intersection is to be passed by making a right turn or left turn, the control device is programmed to cause the vehicle to carry out the right turn or left turn when a travel start button for starting travel from a stopped state is manipulated while the vehicle is in a stopped state due to presence of a target to be paid attention to during travel, such as a vehicle in an opposite lane or a pedestrian, when the vehicle is in the stopped state due to presence of a vehicle in an opposite lane, the control device is programmed to activate and thereby place the travel start button in a manipulation standby state, and further provides, to an onboard person, a notification informing that the travel start button has become active, the control device is programmed with a collision damage reduction function to carry out, when there is a high risk of collision, a measure for reducing collision damages to an onboard person, and in response to manipulation of the travel start button, the control device is programmed to disable or restrict the collision damage reduction function as compared to a case in which the travel start button is not manipulated, and, subsequent to starting travel, after the vehicle has traveled for a predetermined period of time or over a predetermined distance, the control device is programmed to cause the collision damage reduction function to recover its normal state.

* * * * *